United States Patent
Goldfarb et al.

(10) Patent No.: US 10,929,771 B2
(45) Date of Patent: Feb. 23, 2021

(54) MULTIMODAL, SMALL AND BIG DATA, MACHINE TEARING SYSTEMS AND PROCESSES

(71) Applicant: General Electric Company, Schenectady, NY (US)

(72) Inventors: Helena Goldfarb, Niskayuna, NY (US); Kareem Sherif Aggour, Niskayuna, NY (US); Achalesh Pandey, San Ramon, CA (US); Vijay Shiv Kumar, Niskayuna, NY (US); Gerald Wise, Clifton Park, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 873 days.

(21) Appl. No.: 15/351,860

(22) Filed: Nov. 15, 2016

(65) Prior Publication Data

US 2018/0137431 A1    May 17, 2018

(51) Int. Cl.
    *G06Q 10/06*    (2012.01)
    *G06N 20/00*    (2019.01)
    *G06Q 10/04*    (2012.01)

(52) U.S. Cl.
    CPC ........... *G06N 20/00* (2019.01); *G06Q 10/04* (2013.01); *G06Q 10/06* (2013.01)

(58) Field of Classification Search
    CPC ............................... G06F 16/20; G06Q 10/06
    USPC ....................................................... 707/602
    See application file for complete search history.

(56) References Cited

U.S. PATENT DOCUMENTS

| | | | |
|---|---|---|---|
| 5,720,003 A | 2/1998 | Chiang et al. | |
| 6,629,095 B1 * | 9/2003 | Wagstaff | G06F 16/284 |
| 6,772,149 B1 | 8/2004 | Morelock et al. | |
| 7,409,371 B1 * | 8/2008 | Heckerman | G06N 20/00 706/12 |
| 7,809,729 B2 * | 10/2010 | Chu | G06F 16/2465 707/741 |
| 8,923,630 B2 | 12/2014 | Guo et al. | |
| 9,361,263 B1 * | 6/2016 | Florissi | G06F 15/161 |

(Continued)

OTHER PUBLICATIONS

Snoek, Jasper et al., "Practical Bayesian Optimization of Machine Learning Algorithms", Advances in Neural Information Processing Systems, 2012, 9pgs.

(Continued)

*Primary Examiner* — Joshua Bullock
(74) *Attorney, Agent, or Firm* — Buckley, Maschoff & Talwalkar LLC (57) ABSTRACT

According to some embodiments, system and methods for building a model are provided, comprising a display; a memory storing processor-executable process steps; and a processor to execute the processor-executable process steps to cause the system to: present a user interface on a display, the user interface including one or more user-entry fields to build a model, user-entry fields is associated with a selection of big data or small data for use with the model; receive at least one data source in a user-entry field associated with the model; determine if data in the data source includes big data or small data; and in response to the determination of big data or small data in the data source, execute the model with data from the data source in a big data or small data execution environment. Numerous other aspects are provided.

26 Claims, 8 Drawing Sheets

(56) References Cited

U.S. PATENT DOCUMENTS

| | | |
|---|---|---|
| 9,424,533 B1 | 8/2016 | Zadeh |
| 2012/0022910 A1* | 1/2012 | Chi ................... G06F 9/5072 |
| | | 705/7.22 |
| 2015/0347101 A1 | 12/2015 | Boehm et al. |
| 2016/0188207 A1 | 6/2016 | Choi et al. |
| 2016/0217390 A1 | 7/2016 | Shoaib et al. |
| 2017/0038969 A1* | 2/2017 | Choi ................... G06F 3/0656 |
| 2017/0193391 A1* | 7/2017 | Chen ................... G10L 15/183 |

OTHER PUBLICATIONS

Sweeney, Elizabeth M. et al., "A Comparison of Supervised Machine Learning Algorithms and Feature Vectors for MS Lesion Segmentation Using Multimodal Structural MRI", PLOS One, vol. 9, Issue 4, Apr. 29, 2014, e95753, http://www.ncbi.nlm.nih.gov/pmc/articles/PMC4004572/,14pgs.

Noda, Kuniaki et al., "Multimodal Integration Learning Of Robot Behavior Using Deep Neural Networks", Robotics and Autonomous Systems, vol. 62, Issue 6, Jun. 2014, (pp. 721-736, 16 total pages).

\* cited by examiner

FIG. 8

MULTIMODAL, SMALL AND BIG DATA, MACHINE TEARING SYSTEMS AND PROCESSES

BACKGROUND

Industrial equipment or assets, generally, are engineered to perform particular tasks as part of a business process. For example, industrial assets can include, among other things and without limitation, manufacturing equipment on a production line, wind turbines that generate electricity on a wind farm, healthcare or imaging devices (e.g., X-ray or MRI systems) for use in patient care facilities, or drilling equipment for use in mining operations. The design and implementation of these assets often takes into account both the physics of the task at hand, as well as the environment in which such assets are configured to operate.

Low-level software and hardware-based controllers have long been used to drive industrial assets. However, the rise of inexpensive cloud computing, increasing sensor capabilities, and decreasing sensor costs, as well as the proliferation of mobile technologies have created opportunities for creating novel industrial assets with improved sensing technology that are capable of transmitting data that can then be transmitted to a network. As a consequence, there are new opportunities to enhance the business value of some industrial assets using novel industrial-focused hardware and software.

Data scientists leverage machine learning techniques to build models that make predictions from real data. Typically, there are several pre-processing steps applied to raw data before machine learning models are applied to the data. Some examples of pre-processing steps include data quality processes (e.g., imputations and outlier removal), and feature extraction processes. Traditionally, such processes and models are built to work with either big data samples (e.g., a large number of data samples, for example terabytes or more of data that are too large to fit on a single machine and thus must be stored across multiple machines) or small data samples (e.g., a small number of data samples, for example kilobytes or megabytes of data that can be easily stored and processed on a single machine).

It would be desirable to provide systems and methods to improve the building of models in a way that provides faster, more effective model-building and execution across data sizes.

BRIEF DESCRIPTION

According to some embodiments, a system for building a model includes a display; a memory storing processor-executable process steps; and a processor to execute the processor-executable process steps to cause the system to: present a user interface on a display, the user interface including one or more user-entry fields to build a model, user-entry fields is associated with a selection of big data or small data for use with the model; receive at least one data source in a user-entry field associated with the model; determine if data in the data source includes big data or small data; and in response to the determination of big data or small data in the data source, execute the model with data from the data source in a big data or small data environment.

According to some embodiments, a method for building a model includes presenting a user interface on a display, the user interface including one or more user-entry fields to build a model; receiving at least one data source in a user-entry field associated with the model; determining if data in the data source includes big data or small data; and executing the model with data from the data source in one of a small data environment or a big data environment in response to the determination of big data or small data.

According to some embodiments, a non-transitory, computer-readable medium stores instructions that, when executed by a computer processor, cause the computer processor to perform a method for building a model, the method comprising presenting a user interface on a display, the user interface including one or more user-entry fields to build a model, wherein at least one of the user-entry fields is associated with a selection of big data or small data for use with the model; receiving at least one data source in a user-entry field associated with the model; determining if data in the data source includes big data or small data; and executing the model with data from the data source in one of a small data environment or a big data environment in response to the determination of big data or small data.

A technical effect of some embodiments of the invention is an improved and/or computerized technique and system for building a single operation or model that will execute in either a small or big data execution environment. With this and other advantages and features that will become hereinafter apparent, a more complete understanding of the nature of the invention can be obtained by referring to the following detailed description and to the drawings appended hereto.

Other embodiments are associated with systems and/or computer-readable medium storing instructions to perform any of the methods described herein.

DETAILED DESCRIPTION

Data scientists leverage machine learning techniques to build models that make predictions from real data. Typically there are several pre-processing steps applied to raw data before machine learning models are applied to the data. Some examples of pre-processing steps include data quality processes (e.g., imputations and outlier removal), and feature extraction processes. Traditionally, such processes and models are built to work with either big data samples ("big data") (e.g., a large number of data samples, for example terabytes or more of data that are too large to fit on a single machine and thus must be stored across multiple machines) or small data samples ("small data") (e.g., a small number of data samples, for example kilobytes or megabytes of data that can be easily stored and processed on a single machine). If the model can only be executed in one environment (e.g., small data) then it may not be scalable to real-world problems. If the model is written for big data, the model may be written in a custom language, supported only by the big data environment (e.g., Apache Spark, H2O).

When the environment is a small data environment (e.g., personal computer), if the data is big data, the small data environment may not have enough disk space or memory to process the big data. As used herein, a "small data environment" refers to a single traditional desktop, laptop, or similarly-scaled server. As such, conventionally, if the data is big data and the environment is a small data environment, pre-processing steps may include feature extraction to reduce the size of the data to be more manageable for model training steps (e.g., machine learning) in a small data environment.

When the environment is a large data environment (e.g., a multi-node commodity cluster ("cluster")), if the data is small data, pre-processing the small data in the large data environment may introduce unnecessary overhead and slow down the computations. As used herein, a "large data environment" refers to a multi-node cluster of commodity hardware that may be used to store and run operations in parallel on subsets of the overall dataset, such that all of the input data may be stored and processed by at least one node.

One or more embodiments provide a system and method for pre-processing steps, such as data quality and feature engineering, on either big or small data. One or more embodiments provide the dual mode (big and small data) execution of models written in a common language (e.g., Python). The inventors note a benefit of embodiments is that a Machine Learning scientist may develop an algorithm using a common programming language (e.g., Python or Java) without being concerned about the complexities of Big Data execution, deploy that model in a machine learning platform and embodiments provide that the model will be executed in the correct environment (big or small data) based on the size of the input data and user preference.

In one or more embodiments, a user interface is provided, and a user indicates that the data is one of big data or small data. In one or more embodiments, based on the user indication, an interface may execute data processing models ("models") in a small data environment and in a big data environment. In one or more environments, the user may select a technique to be executed by the model and that technique may be built to be performed on one of small or big data, such that the user implicitly selects big or small data based on the selection of a given technique. In one or more embodiments, the user may explicitly select big or small data. The inventors note that a benefit of one or more embodiments is that a single model may be used for both big data and small data, instead of separate models tailored to execution in one of either a big data or small data environment. In one or more embodiments, an interface may determine a data size and automatically select one of a small data environment and a large data environment in which to execute the model.

In one or more embodiments, for small data, models may be executed via an interface call to a model running in a container, which may be running on a host node. In one or more embodiments, for large data, models may be executed via an interface call to a set of micro-services running on a cluster.

In one or more embodiments, for execution of big data in a big data environment, an execution infrastructure may include two components. The first component may be a micro-service (e.g., Java-based SpringBoot application, or any other suitable micro-service) that receives a request (e.g., JSON request) containing all of the parameters used to execute a specific model that is one of already pre-deployed on the cluster or able to be uploaded at runtime. The micro-service may interpret a few parameters from the request (e.g., JSON configuration), including a location of the model and a location of the input data to feed to the model, and the micro-service may pass those parameters as arguments to a second component (e.g., a Python-based Apache Spark ("Spark") application). In one or more embodiments, the first component may be responsible for receiving the user request and parsing the initial parameters and the second component may be responsible for reading and distributing the input data, executing the desired model/analytic on that distributed input in a parallel fashion, and storing the output (e.g., to a data store such as Apache Hive, for example). By storing the output (e.g., analytic results) to a data store that may be used as an input source to the second component, and coupling that with the ability to read input data from a cluster, the inventors note that processes/analytics/models may be chained together easily in sequences. This allows the machine learning scientist to very easily execute pipelines or workflows of operations, such as a data cleaning step, a missing data imputation step, a feature extraction step, and an analytical model execution, all with a single command. In one or more embodiments, once the output/results are available in the data store, a separate set of micro-services may be used to post-process the results, including running statistical analyses of individual columns (e.g., calculating means, standard deviations, variances, etc.), as well as performing more complex operations such as calculating histograms and percentiles of the columns and returning subsets of the data.

As used herein, a container may include an entire run-time environment (e.g., application platform): an application, plus all its dependencies, libraries and other binaries, and configuration files needed to run the application, bundled into one package. By containerizing the application platform and its dependencies, differences in operating system distributions and underlying infrastructure may be largely inconsequential.

As used herein, a "kernel" may refer to a model before the parameters have been set. The kernel may be trained on a data set, and the trained kernel is the "model." As used herein, the term "kernel" and "model" may be used interchangeably.

Embodiments may provide significant technical improvements to facilitate both machine learning model building and execution of the model on big and small data. The present invention is directed to more than merely a computer implementation of a routine or conventional activity previously known in the industry, as it significantly advances the technical efficiency of model building and execution by implementing a specific new method and system as defined herein. The present invention is a specific advancement in the area of modeling by providing benefits in model design, and such advances are not merely a longstanding commercial practice. The present invention provides improvement beyond a mere generic computer implementation as it involves the processing and conversion of significant amounts of data in a new beneficial manner as well as the interaction of a variety of specialized client and/or third party systems, networks and subsystems. For example, in one or more embodiments, a modeling processor may process and analyze information to provide extremely valuable features to facilitate model creation and execution, thus improving the overall performance of a system.

Figure 1:
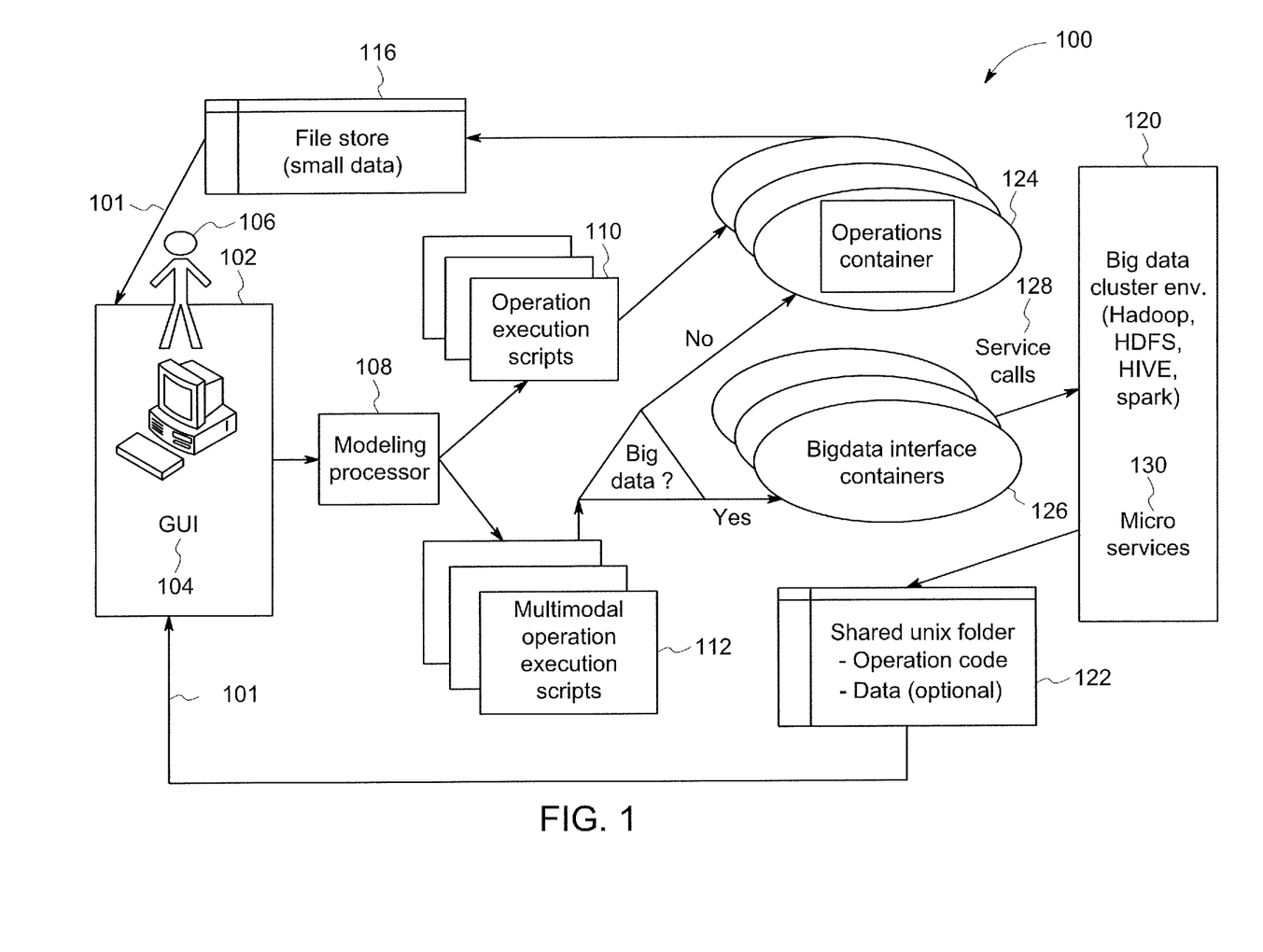
FIG. 1 illustrates a system according to some embodiments.

FIG. 1 is a high-level architecture of a system 100 in accordance with some embodiments. In one or more embodiments, the system 100 may include a user platform 102 (e.g., a personal computer, tablet or smartphone) to view information about and/or design/build a model in accordance with any of the embodiments described herein. According to some embodiments, an interactive graphical display (e.g., graphical user interface "GUI") 104 may let an operator/user define and/or adjust certain parameters of models and/or provide or receive automatically generated recommendations or results. Presentation of a user interface as described herein may comprise any degree or type of rendering, depending on the type of user interface code generated by an application server (not shown).

For example, a user 106 may execute a Web Browser to request and receive a Web page (e.g., in HTML format) via HTTP, HTTPS, and/or WebSocket, and may render and present the Web page according to known protocols. One or more users 106 may also, or alternatively, present user interface 104 by executing a standalone executable file (e.g., an .exe file) or code (e.g., a JAVA applet) within a virtual machine.

The system 100 may also include a modeling processor 108 that may execute, at least, an operation execution script 110 and a multimodal operation execution script 112, an operation container 124, a file store 116, a big data interface container 118, a big data cluster environment 120, and an output data store 122 (e.g., shared Unix folder, that may include at least one of operation code and data). In one or more embodiments, the operation may be, for example, model training, a cleaning operation, data transformation, or any other suitable operation.

According to some embodiments described herein, the system 100 may be used to provide models in association with a machine learning framework, for example, a "digital twin" of a twinned physical system. A digital twin may be a high fidelity, digital replica or dynamic model of an asset or process, used to continuously gather data and increase insights, thereby helping to manage industrial assets at scale and optimize business operations. Digital twins may leverage data from sensors to represent near real-time status and operational conditions of an asset or process. A digital twin may estimate a remaining useful life of a twinned physical system using sensors, communications, modeling, history, and computation. It may provide an answer in a time frame that is useful, that is, meaningfully prior to a projected occurrence of a failure event or suboptimal operation. It might comprise a code object with parameters and dimensions of its physical twin's parameters and dimensions that provide measured values, and keeps the values of those parameters and dimensions current by receiving and updating values via outputs from sensors embedded in the physical twin. The digital twin may comprise a real time efficiency and life consumption state estimation device. It may comprise a specific, or "per asset," portfolio of system models and asset specific sensors. It may receive inspection and/or operational data and track a single specific asset over its lifetime with observed data and calculated state changes. Some digital twin models may include a functional or mathematical form that is the same for like asset systems, but will have tracked parameters and state variables that are specific to each individual asset system.

A digital twin's software could reside near the asset and used to help control the operation of the asset. Another location might be at a plant or farm level, where system level digital twin models may be used to help determine optimal operating conditions for a desired outcome, such as minimum fuel usage to achieve a desired power output of a power plant. In addition, a digital twin's software could reside in the cloud, implemented on a server remote from the asset.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

Figure 2:
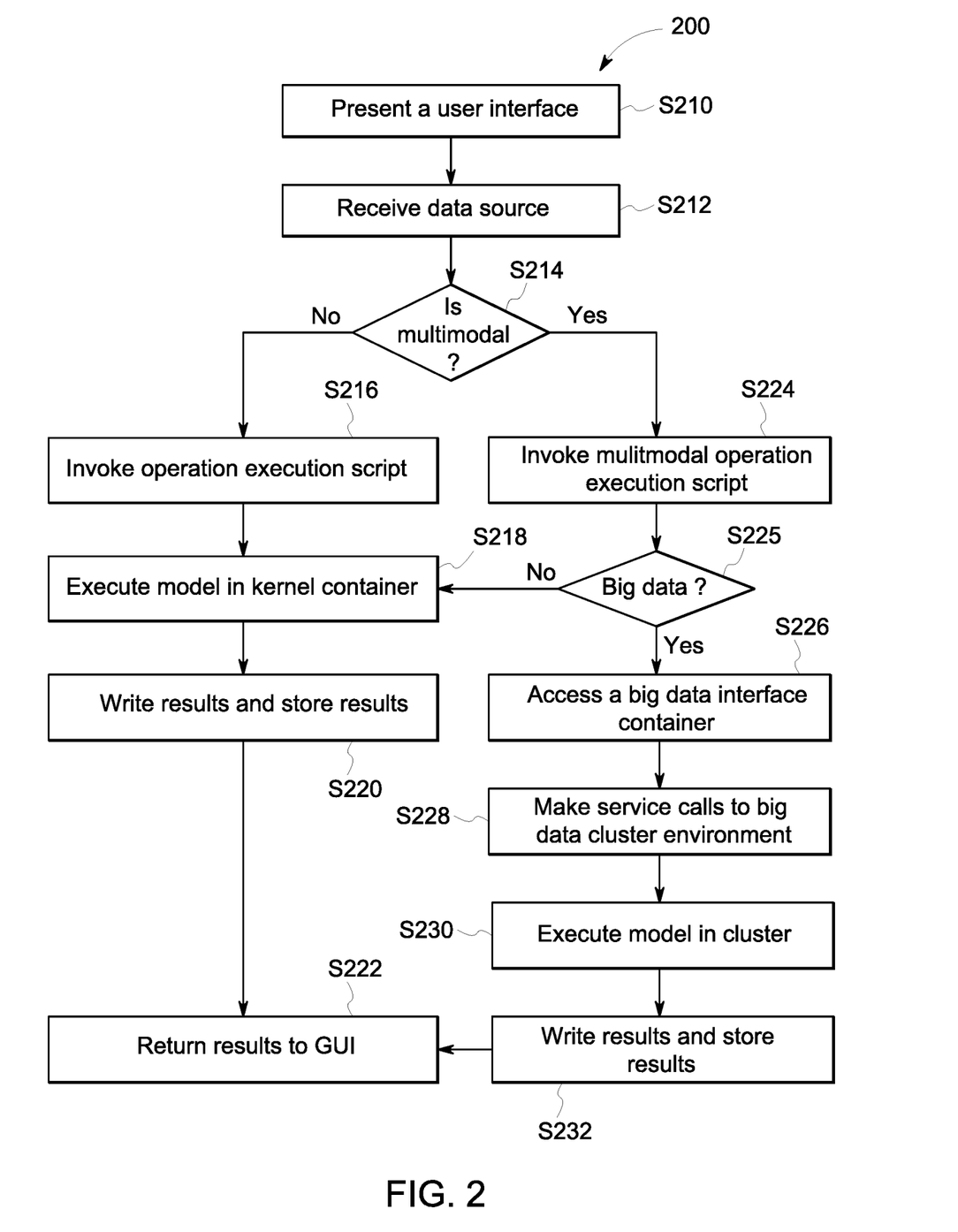
FIG. 2 illustrates a flow diagram according to some embodiments.

Turning to FIGS. 2-6, a flow diagram of an example of operation and user interfaces according to some embodiments are provided. In particular, FIG. 2 provides a flow diagram of a process 200, according to some embodiments. Process 200, and other processes described herein, may be performed using any suitable combination of hardware (e.g., circuit(s)), software or manual means. For example, a computer-readable storage medium may store thereon instructions that when executed by a machine result in performance according to any of the embodiments described herein. In one or more embodiments, the system 100 is conditioned to perform the process 200 such that the system is a special-purpose element configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto. The flow chart(s) described herein do not imply a fixed order to the steps, and embodiments of the present invention may be practiced in any order that is practicable.

Initially at S210, a user interface 300 (FIG. 3) is provided to a user 106. The user interface 300 may be for a model building framework. In some embodiments, the model building framework may allow the user 106 to build a model that may be executed in both a big data environment and a small data environment. The user interface 300 may include a menu 302 including one or more selectable options 304. In one or more embodiments, the selectable options 304 may include a home option 304, a build option 304, a task option 304 and a visualize data option 304. Other suitable options may be used.

Figure 3:
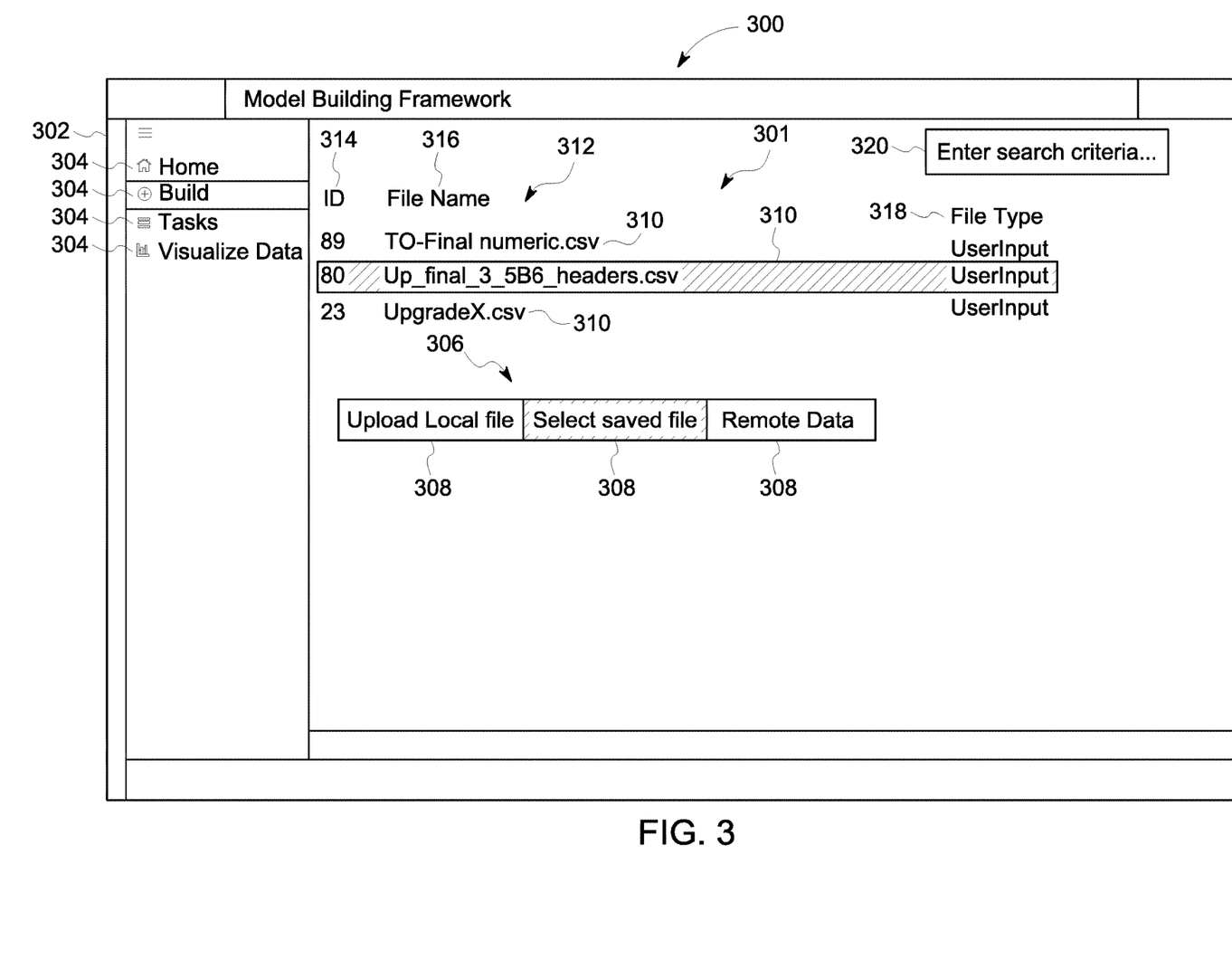
FIG. 3 illustrates a user interface according to some embodiments.

In the non-exhaustive example shown in FIGS. 3-6, the user 106 selects the build option 304, and is presented with a data sub-menu 306. In one or more embodiments, the data sub-menu 306 includes one or more selectable options 308, for selecting a data file to be used with the model, as further described below. In one or more embodiments, the one or more selectable options include, but are not limited to, an upload local file option 308, a select a saved file option 308, and a remote data option 308. As shown in FIG. 3, the user 106 selected the select saved file option 308, and three saved data files 310 are populated in a first area 312 if screen 301. In one or more embodiments, the first area 312 may include an identification number 314 associated with the saved data file 310, a file name 316 associated with the saved data file 310 and a file type 318 associated with the saved data file 310. Other suitable parameters may be associated with the saved data file 310 and displayed in the first area 312. While a User Input file type 318 is shown herein, other suitable file types 318 may be used, for example text file or data may be stored in a database. In one or more embodiments, the user 106 may search for a saved data file 310 with a text string via a search box 320.

Turning back to the process 200, in S212, the data source is received. In one or more embodiments, the data may be received from a local server. Continuing with the example in FIG. 3, for example, the user 106 selects the saved data file 310 (data source) having identification number 314: 80, file name 316: CR_final_3_5B6_headers.csv; and file type 318: User input. After selection of the saved data file 310, the user may submit the selection via any suitable means (e.g., double-clicking, selection of a "submit" control, etc.) While the example described herein provides for highlighting the user selections (e.g., build option 304 and select saved file option 308), the user 106 may make selections via any suitable selection manner (e.g., radio buttons, check boxes, user-entry fields, etc.).

In embodiments, after the user 106 selects the saved data file 310, the user may be presented with another screen 400 (FIG. 4) including a file summary area 402 (FIG. 4) that may provide a summary of the saved data file 310. Continuing with the example used herein, for the saved data file of file name 316: CR_final_3_5B6_headers.csv, the file summary area 402 may include a file size 404 (e.g., 51.3 KB), a number of fields 406 (e.g., 7) and a number of entries 408 (e.g., 1000) for the saved data file 310. In one or more embodiments, the file summary area 402 may also include one or more selectable options 410, including but not limited to an add data option 412, an upload local file option 414, a select saved file option 416 and a remote data option 418. Other suitable selectable options 410 may be included in the file summary area 403.

Figure 4:
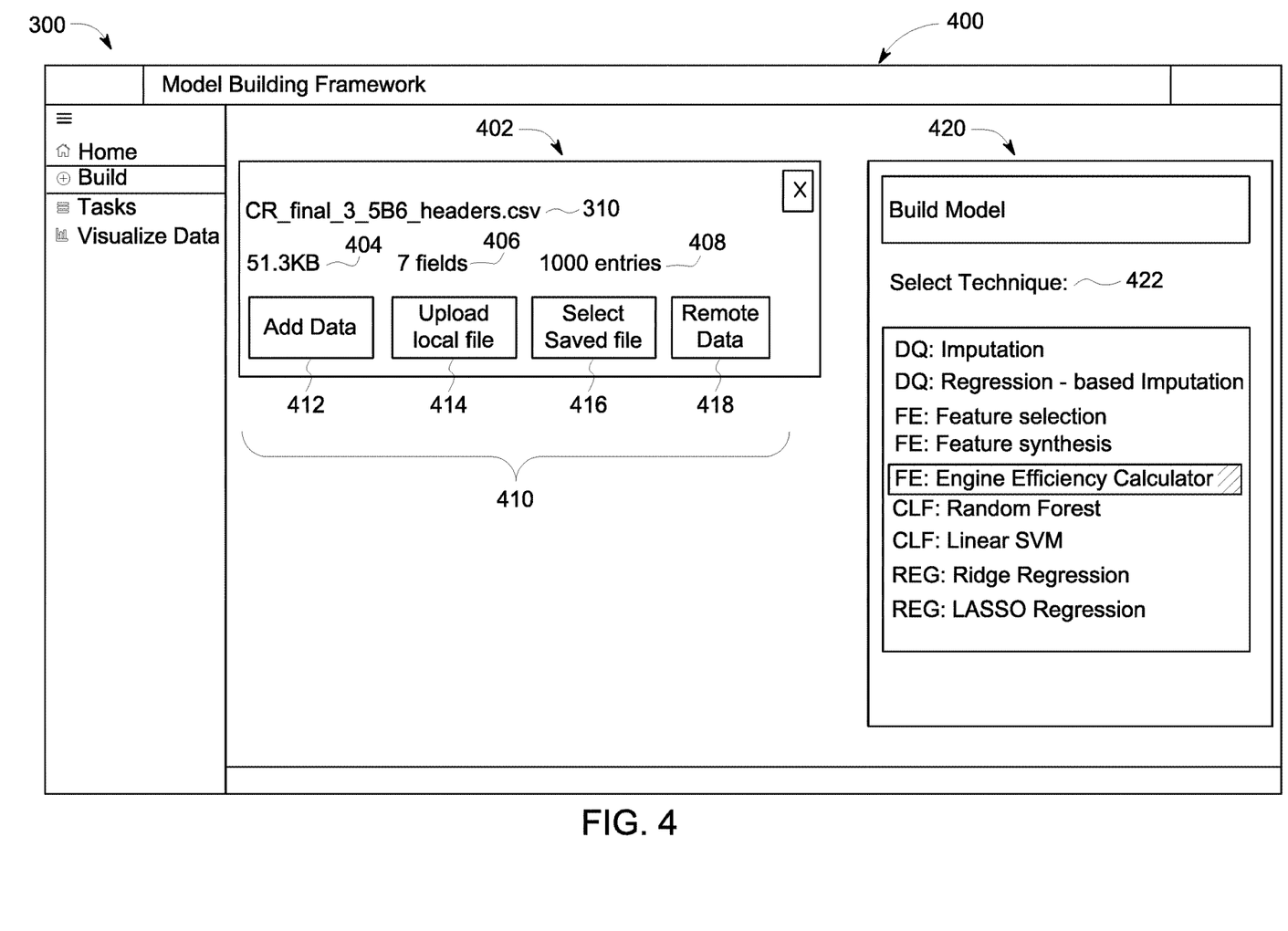
FIG. 4 illustrates a user interface according to some embodiments.

In one or more embodiments, the second screen 400 may also include a build model area 420 including one or more selectable techniques 422 to define a technique performed by the model. The selectable techniques 422 may include, for example, Imputation, Regression-based Imputation, Feature selection, Feature Synthesis, Engine Efficiency Calculator, Random Forest, Linear SVM, Ridge Regression, and LASSO Regression. Other suitable selectable techniques 422 may be used. In the example shown herein, the Engine efficiency calculation technique 422 is selected. In one or more embodiments, selection of a technique 422 may be executed via one of double-clicking on the technique, highlighting a technique and selecting a submit control (not shown), or by any other suitable selection manner.

In embodiments, after selection of the technique 422, a third screen 500 (FIG. 5) may be presented to the user 106. In one or more embodiments, the number of fields available for use with a particular technique may be less than or equal to the number of fields available in the saved data file 310 as a whole. For example, file name: 316: CR_final_3_5B6_headers.csv had 7 fields available in FIG. 4, and then, after the user selected the Engine Efficiency technique 422, the available number of fields 406 is 5.

Figure 5:
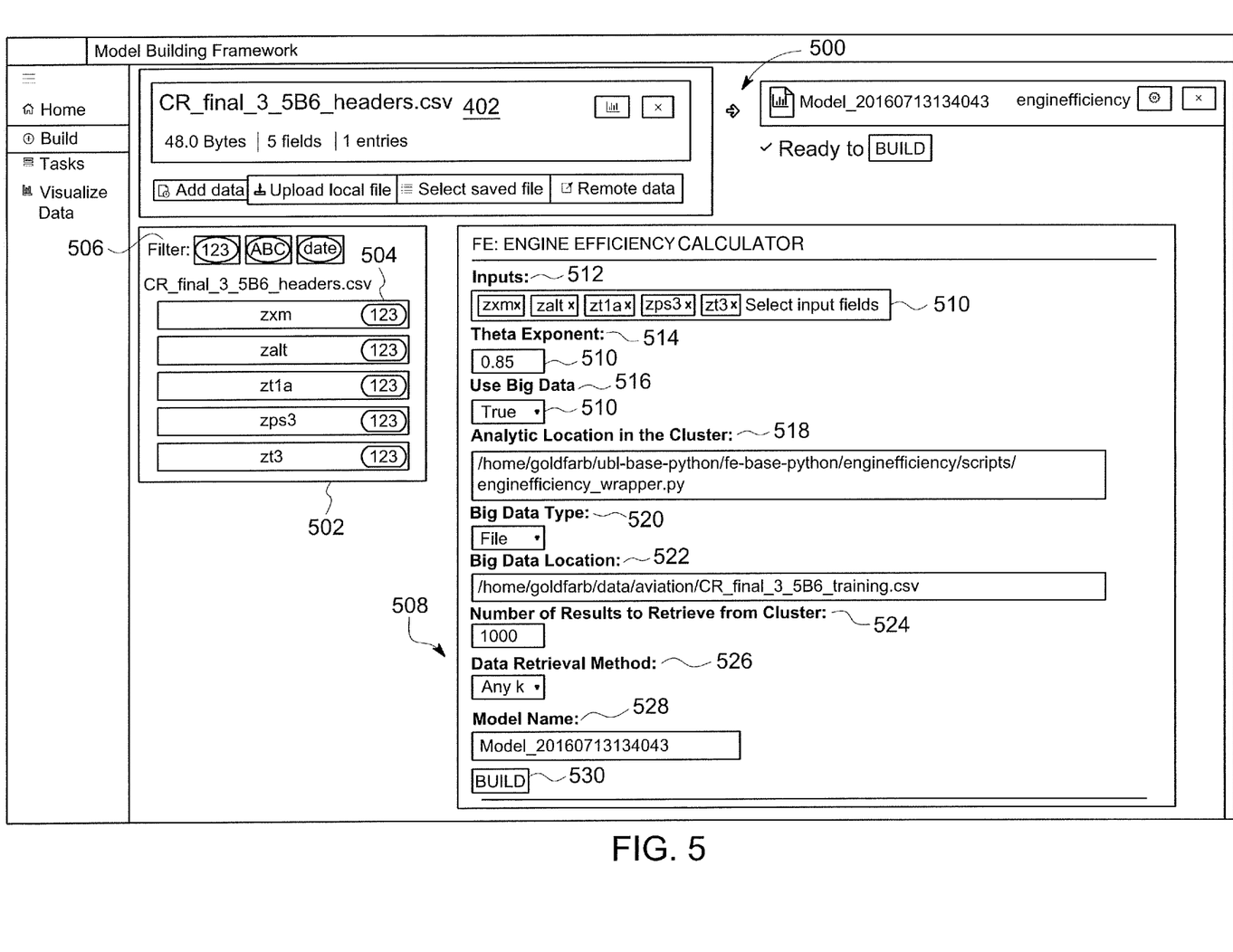
FIG. 5 illustrates a user interface according to some embodiments.

In one or more embodiments, the third screen 500 may include a field menu area 502, listing the fields 504 available for use in the model. In one or more embodiments, the user may select all or less than all of the fields 504. In one or more embodiments, the user may apply a filter 506 to the fields 504. In one or more embodiments, the user 106 may filter the fields 504 based on at least one of a numerical filter, an alphabetical filter and a date filter 506.

In one or more embodiments the third screen 500 may include a model design area 508. The model design area 508 may include one or more user-entry fields 510 that may define parameters associated with the model. For example, the user-entry fields 510 may include an input field 512, a theta exponent field 514, a use big data field 516, an analytic location in the cluster field 518, a big data type field 520, a big data location field 522, a number of results to retrieve from the cluster field 524, and a model name field 528. Other suitable fields may be used. In one or more embodiments, the model design area 508 may include a build or submit control 530 to begin building and execution of the model.

In embodiments, the user 106 may select any of the fields 504 in the field menu to include in the input field 512. As shown herein, the five fields 504 (zxm, zalt, ztla, zos3, zt3) were selected to be included in the input field 512. In one or more embodiments, the user may enter model parameters. For example, a Theta Exponent in the theta exponent field 514. In one or more embodiments, the model parameters may be prepopulated with default values, but users may change them. These model parameters may be passed to the model when the build starts.

In embodiments, the user 106 may indicate in the use big data field 516 whether the data is big data or not. If the data is not big, the selected file and the model parameters may be passed to the model for execution in embodiments. If the data is big, the location of the model script and the location of the data in the Big Data environment may be specified in one or more embodiments. The Big Data may be stored in a file, a set of files in a directory folder, in HDFS table or in HIVE table. In one or more environments, the user may select a technique to be executed by the model and that technique may be executed using small or big data, such that the user implicitly selects big of small data based on selection of a given technique. In one or more embodiments, the user may explicitly select big or small data. In one or more embodiments, the user 106 may also provide information in the other user-entry fields 510, as appropriate. After the user 106 is satisfied, the user may select the "build" control 530 to begin executing the model.

Returning to the process 300, in one or more embodiments, after the user selects the "build" control 530, it is determined if the technique can support big and small data or only small data S214. In one or more embodiments the user may decide if the data is big data or small data and indicate that information in the use big data filed 516. In one or more embodiments, the use big data field 516 may include a drop-down menu, allowing the user to select between "true/false," "yes/no," etc. In one or more embodiments, the user may enter text to indicate if big data is being used. In one or more embodiments, the system 100 may determine that the data is big data or small data based on the size of the data file and/or number of entries, or any other suitable metric.

If it is determined in S214 that a technique is not multi-modal, i.e. it cannot support both big data and small/medium data, and instead it may only support small or medium data, the process 200 continues to S216, and an operation execution script 110 is invoked. In one or more embodiments, the modeling processor platform 108 may invoke the operation executions script 110 to run one or more operations locally in a small data environment (e.g., operations container 124). Then in S218, a model is executed in an operations container 124. In one or more embodiments, the model container 124 may be a Docker container, or any other suitable program that may be executed, for example and exe file or a python file. As used herein, a "container" is a software packaging method consisting of an application's complete runtime environment, including its dependencies, libraries, and configuration files, allowing the application to run reliably when moved from one computing environment to another. The inventors note that Docker is a widely used open-source application used for building and deploying containers. A GUI, a database, or a Spring Boot application are other examples of containers. In one or more embodiments, the model may be executed by calls to a model process running in the operations container 124, which may in turn be running on a host node (not shown) in the system 100. In one or more embodiments, the calls may include ReadHyperParameters from an input file and ReadInputData from a flat file. In one or more embodiments, the input file may be in a JSON format, or any other suitable format, for example a text file, XML file or HTML file. In one or more embodiments, the input file may describe parameters for the model and a location of the data (e.g., where on a server or where it's located so a cluster may access it). In one or more embodiments, the flat file may be in a Comma Separated Values (CSV) format, or any other suitable format, for example data may be stored in a database.

In one or more embodiments, after execution of the model, the operation container 124 may write the results 101 to a flat file (e.g., CSV) and store the results in a file store 116 in S220. Then, in one or more embodiments, the results 101 may be returned to the graphical user interface 300 in S222. In one or more embodiments, the results 101 may include a status of the execution of the model 602 (FIG. 6), a log of errors when they occur (not shown), metrics of the results 604 (FIG. 6), and other suitable information. In one or more embodiments, the metrics and other suitable information (e.g., counts and data sample) may be made available for generating charts 606 (FIG. 6) or any other suitable visualizations.

If it is determined in S214 that a kernel is a multimodal kernel, the process 200 continues to S216, and a multimodal operation execution script 112 is invoked in S224. In one or more embodiments, the multimodal operation execution script 112 may be invoked by the modeling processor 108.

In one or more embodiments, the multimodal operation execution script 112 may analyze the data file to determine if the data is big data or small data in S225. If the multimodal operation execution script 112 determines the data is small data in S225, despite the user indication (explicit or implicit) otherwise, the process may return to S218. In one or more embodiments, if the multimodal operation execution script 112 may decide the data is small data, it may run the model in a small environment instead of a big environment because to run small data in a big environment may introduce unnecessary overhead and slow down the computations.

If it is determined in S225 that the data is big data, the model should be run in a cluster using big data stored in one of a Hive table, a directory accessible by the cluster, a Hadoop Distributed File System (HDFS), or any other suitable big data cluster environment 120.

In one or more embodiments, following invocation of the multimodal operation executions script 112, the multimodal operation execution script 112 may access a big data interface container 126 in S226. In one or more embodiments the big data interface container 126 may use a wrapper or an interface to launch/execute the multimodal operation associated with the model in the big data cluster environment 120. In one or more embodiments, the big data interface container 126 may be responsible for communicating with the big data cluster environment 120, and the big data interface container 126 may send the location of the data and the location of the model to the big data cluster environment. In one or more embodiments, the big data interface container 126 may poll and wait for the big data cluster environment 120 to complete execution of the model. In one or more embodiments, the big data interface container 126 may be a Docker container, or any other suitable container. In one or more embodiments, the big data interface container 126 may make one or more service calls 128, instructing the big data cluster environment 120 on invoking the model in S228. In one or more embodiments, the big data interface container 126 may leverage a set of micro-services 130 running in the big data cluster environment 120.

In one or more embodiments, the micro-services 130 may initiate the execution of the model build in S230 by launching an application on the big data cluster environment 120. In one or more embodiments the launched application may be a Python-based Apache Spark ("spark") application, although any suitable application may be used. In one or more embodiments, the launched application may ReadHyperParameters from a standard input (e.g., JSON format file), read in the input data (e.g., 512) (e.g., from a standard input file), split the input data into one or more groups or buckets, and apply the desired model (e.g., as selected per the Analytic location in the cluster user-entry field 518) to those groups of the input data in parallel across the big data cluster environment 120, such that the process may effectively be executed in parallel and reduce the execution time. The inventors note that in addition to reducing the execution time, a benefit of using a Big Data environment is that the data that is too big to fit on a sever or personal computer may be used. In one or more embodiments, the groups may hold approximately the same or different amounts of data. In one or more embodiments, the input data may be read from a local file on a local server, for example, or directory on a network, from a file or directory in the HDFS, or from an Apache Hive table, which may also be stored in the HDFS, or from any other suitable location.

In one or more embodiments, the micro-services 130 may be invoked as Representational State Transfers (REST) calls over HTTP. In one or more embodiments, the REST calls may use JSON format for the request (e.g., service call 128), and the response (e.g., result 101) may use a set of utilities developed in Python language. Other suitable formats may be used. As used herein, REST services may refer to an architectural style and communication approach that may be easy to consume by other services or applications (e.g., in a cloud environment) via their web Application Programming Interface (API).

In one or more embodiments, when the data is small data, users may upload the data set to a backend server using a front end web interface, and the file store may be made available to the operation container 124 executing the operation at execution time. However, in one or more embodiments, with big data, the data may already be contained in the cluster environment. As such, in one or more embodiments, when executing the multimodal operation script for big data, the JSON input specifies the location of the data as well as the location of the model/kernel technique (script) on the cluster. For example, with respect to the example shown in FIG. 5, the user may input an analytic location in the location accessible by cluster 518, indicating the location of the model/kernel technique, and may input the big data location 522, specifying the location of the big data in a location accessible by the cluster or in the cluster.

In one or more embodiments, each model invoked by the launched application may be expected to write and store its output to a standard output in S232, so that the launched application may read those results, aggregate them, and store them to a newly created table (e.g., Hive table in HDFS).

In one or more embodiments, the launched application may obtain a status of the job (602), including logging errors when they occur (not shown). The inventors note that when running in the big data cluster environment 120, the run time to execute the model build may take some time, therefore it may be desirable to be able to monitor the status of a running job to determine whether or not the run has failed or has completed successfully.

Figure 6:
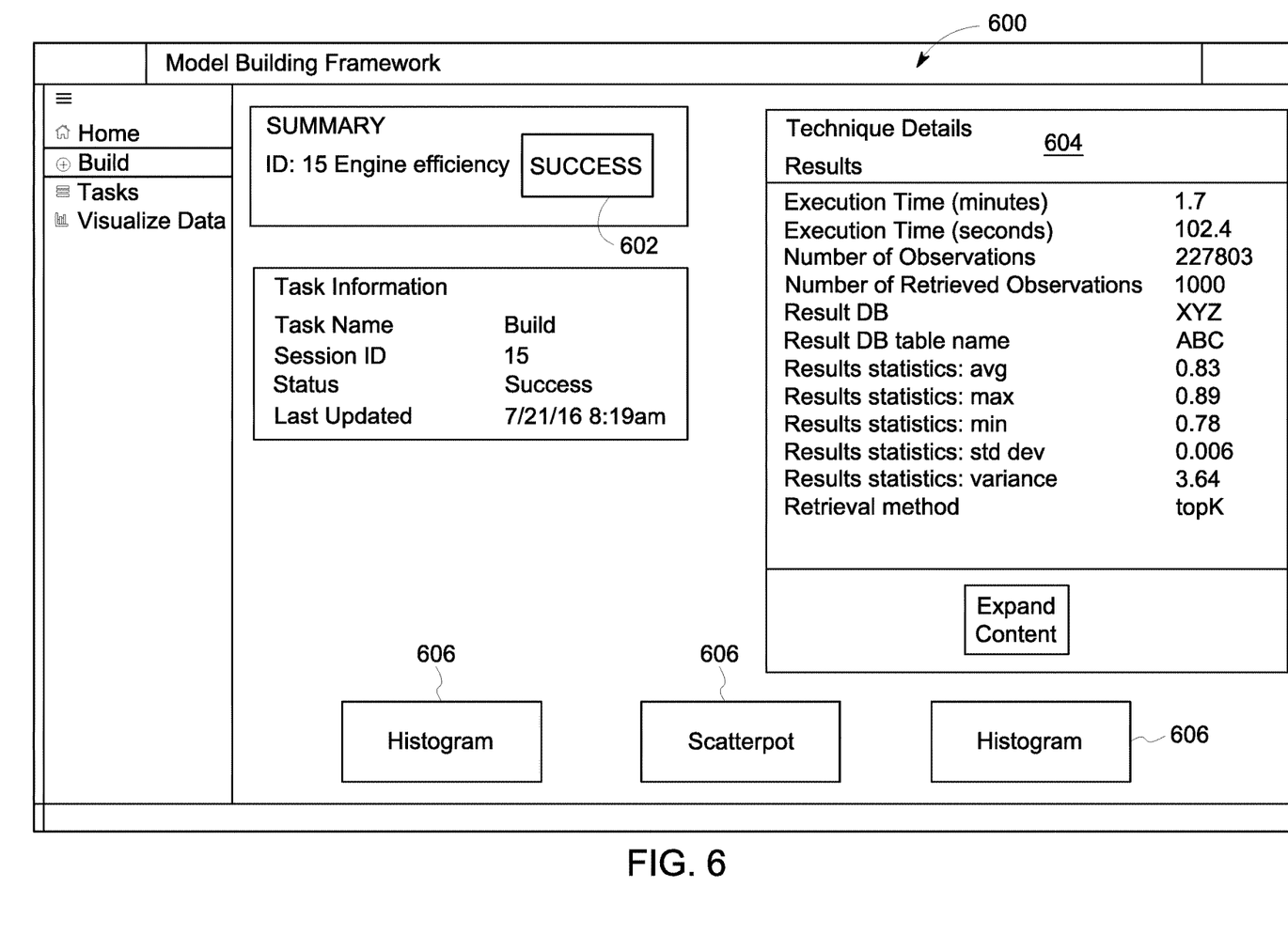
FIG. 6 illustrates a user interface according to some embodiments.

Upon successful completion, result metrics 104 from execution of the model may be retrieved, and a sample of the predicted results may be collected and made available to the user by the launched application. In one or more embodiments, the result metrics 604 may include a count of the number of rows of data that were processed, summary statistics (e.g., average, minimum, maximum, standard deviation, variance) of the results, a sample of K rows from the data (randomly selected or any K rows from the data results may be retrieved). In one or more embodiments, the metrics, counts, and data sample may be made available for generating charts 606 in a screen 600 of the user interface 300 or any other suitable visualizations.

Figure 7:
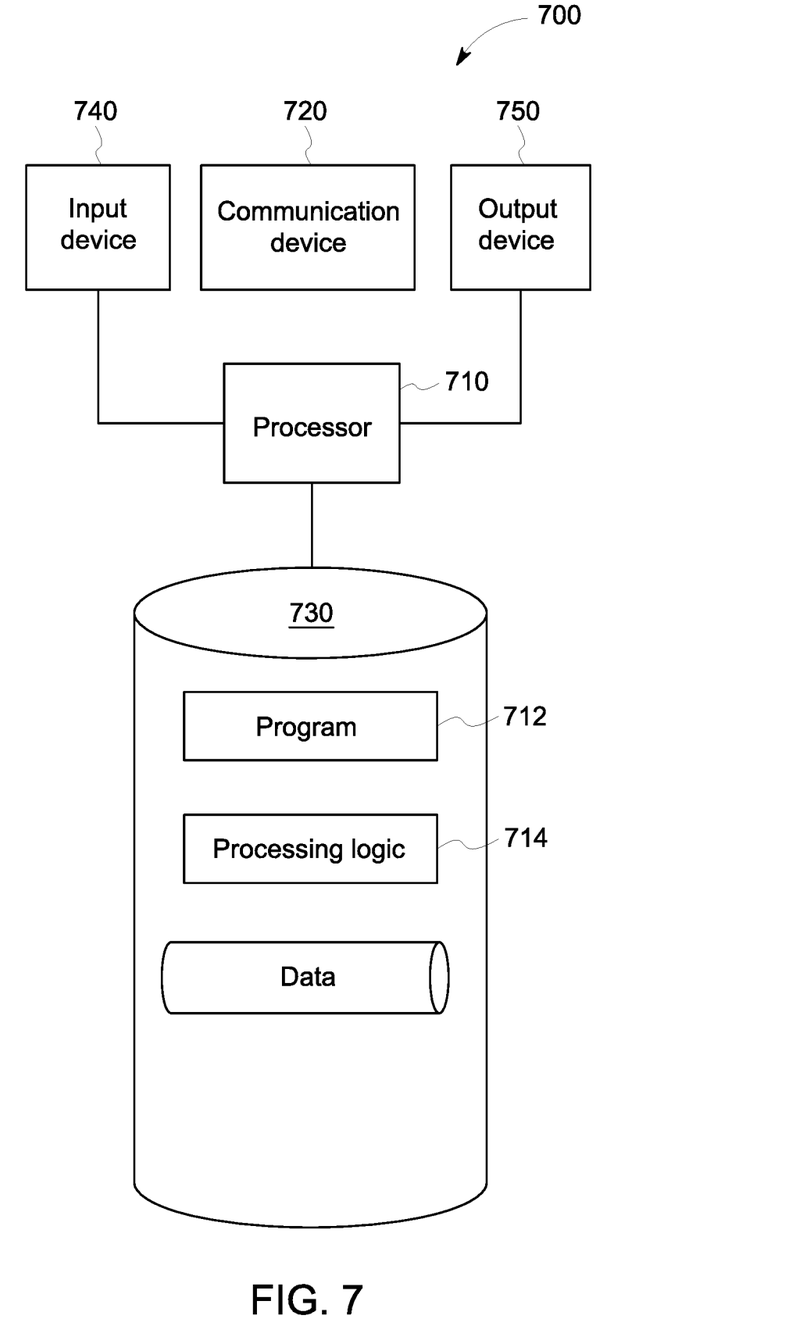
FIG. 7 illustrates a block diagram of a system according to some embodiments.

Note the embodiments described herein may be implemented using any number of different hardware configurations. For example, FIG. 7 illustrates a model build processing platform 700 that may be, for example, associated with the system 100 of FIG. 1. The model build processing platform 700 comprises a model build processor 710 ("processor"), such as one or more commercially available Central Processing Units (CPUs) in the form of one-chip microprocessors, coupled to a communication device 720 configured to communicate via a communication network (not shown in FIG. 7). The communication device 720 may be used to communicate, for example, with one or more users. The model build processing platform 700 further includes an input device 740 (e.g., a mouse and/or keyboard to enter information about the node of interest) and an output device 750 (e.g., to output and display the lineage).

The processor 710 also communicates with a memory/storage device 730. The storage device 730 may comprise any appropriate information storage device, including combinations of magnetic storage devices (e.g., a hard disk drive), optical storage devices, mobile telephones, and/or semiconductor memory devices. The storage device 730 may store a program 712 and/or model build processing logic 714 for controlling the processor 710. The processor 710 performs instructions of the programs 712, 714, and thereby operates in accordance with any of the embodiments described herein. For example, the processor 710 may receive data and then may apply the instructions of the programs 712, 714 to generate a model.

The programs 712, 714 may be stored in a compressed, uncompiled and/or encrypted format. The programs 712, 714 may furthermore include other program elements, such as an operating system, a database management system, and/or device drivers used by the processor 710 to interface with peripheral devices.

As used herein, information may be "received" by or "transmitted" to, for example: (i) the platform 700 from another device; or (ii) a software application or module within the platform 700 from another software application, module, or any other source.

It is noted that while progress with industrial equipment automation has been made over the last several decades, and assets have become 'smarter,' the intelligence of any individual asset pales in comparison to intelligence that can be gained when multiple smart devices are connected together. Aggregating data collected from or about multiple assets may enable users to improve business processes, for example by improving effectiveness of asset maintenance or improving operational performance, if appropriate. Industrial-specific data collection and modeling technology may be developed and applied.

In an example, an industrial asset may be outfitted with one or more sensors configured to monitor respective ones of an asset's operations or conditions. Data from the one or more sensors may be recorded or transmitted to a cloud-based or other remote computing environment. By bringing such data into a cloud-based computing environment, new software applications informed by industrial process, tools and know-how may be constructed, and new physics-based analytics specific to an industrial environment may be created. Insights gained through analysis of such data may lead to enhanced asset designs, or to enhanced software algorithms for operating the same or similar asset at its edge, that is, at the extremes of its expected or available operating conditions.

The systems and methods for managing industrial assets may include or may be a portion of an Industrial Internet of Things (IIoT). In an example, an IIoT connects industrial assets, such as turbines, jet engines, and locomotives, to the Internet or cloud, or to each other in some meaningful way. The systems and methods described herein may include using a "cloud" or remote or distributed computing resource or service. The cloud may be used to receive, relay, transmit, store, analyze, or otherwise process information for or about one or more industrial assets. In an example, a cloud computing system may include at least one processor circuit, at least one database, and a plurality of users or assets that may be in data communication with the cloud computing system. The cloud computing system may further include, or may be coupled with, one or more other processor circuits or modules configured to perform a specific task, such as to perform tasks related to asset maintenance, analytics, data storage, security, or some other function.

However, the integration of industrial assets with the remote computing resources to enable the IIoT often presents technical challenges separate and distinct from the specific industry and from computer networks, generally. A given industrial asset may need to be configured with novel interfaces and communication protocols to send and receive data to and from distributed computing resources. Given industrial assets may have strict requirements for cost, weight, security, performance, signal interference, and the like, such that enabling such an interface is rarely as simple as combining the industrial asset with a general purpose computing device.

To address these problems and other problems resulting from the intersection of certain industrial fields and the IIoT, embodiments may enable improved interfaces, techniques, protocols, and algorithms for facilitating communication with, and configuration of, industrial assets via remote computing platforms and frameworks. Improvements in this regard may relate to both improvements that address particular challenges related to particular industrial assets (e.g., improved aircraft engines, wind turbines, locomotives, medical imaging equipment) that address particular problems related to use of these industrial assets with these remote computing platforms and frameworks, and also improvements that address challenges related to operation of the platform itself to provide improved mechanisms for configuration, analytics, and remote management of industrial assets.

The Predix™ platform available from GE is a novel embodiment of such Asset Management Platform (AMP)

technology enabled by state of the art cutting edge tools and cloud computing techniques that may enable incorporation of a manufacturer's asset knowledge with a set of development tools and best practices that may enable asset users to bridge gaps between software and operations to enhance capabilities, foster innovation, and ultimately provide economic value. Through the use of such a system, a manufacturer of industrial assets can be uniquely situated to leverage its understanding of industrial assets themselves, models of such assets, and industrial operations or applications of such assets, to create new value for industrial customers through asset insights.

Figure 8:
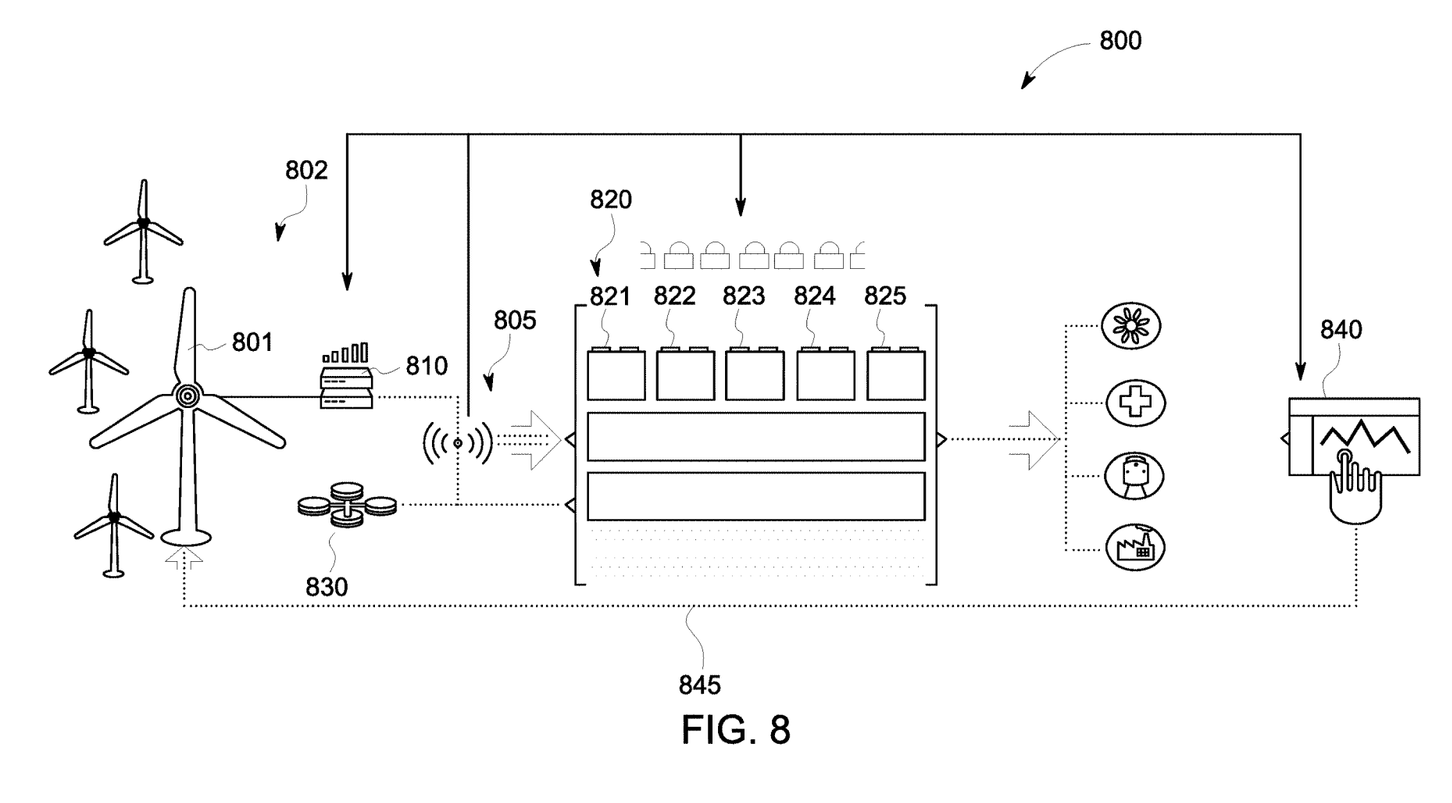
FIG. 8 illustrates a block diagram according to some embodiments.

FIG. 8 illustrates generally an example of portions of a first AMP 800. As further described herein, one or more portions of an AMP may reside in an asset cloud computing system 820, in a local or sandboxed environment, or may be distributed across multiple locations or devices. An AMP may be configured to perform any one or more of data acquisition, data analysis, or data exchange with local or remote assets, or with other task-specific processing devices.

The first AMP 800 may include a first asset community 802 that may be communicatively coupled with the asset cloud computing system 820. In an example, a machine module 810 receives information from, or senses information about, at least one asset member of the first asset community 802, and configures the received information for exchange with the asset cloud computing system 820. In an example, the machine module 810 is coupled to the asset cloud computing system 820 or to an enterprise computing system 830 via a communication gateway 805.

In an example, the communication gateway 805 includes or uses a wired or wireless communication channel that may extend at least from the machine module 810 to the asset cloud computing system 820. The asset cloud computing system 820 includes several layers. In an example, the asset cloud computing system 820 includes at least a data infrastructure layer, a cloud foundry layer, and modules for providing various functions. In the example of FIG. 8, the asset cloud computing system 820 includes an asset module 821, an analytics module 822, a data acquisition module 823, a data security module 824, and an operations module 825. Each of the modules 821-825 includes or uses a dedicated circuit, or instructions for operating a general purpose processor circuit, to perform the respective functions. In an example, the modules 821-825 are communicatively coupled in the asset cloud computing system 820 such that information from one module may be shared with another. In an example, the modules 821-825 are co-located at a designated datacenter or other facility, or the modules 821-825 can be distributed across multiple different locations.

An interface device 840 may be configured for data communication with one or more of the machine module 810, the gateway 805, or the asset cloud computing system 820. The interface device 840 may be used to monitor or control one or more assets. In an example, information about the first asset community 802 is presented to an operator at the interface device 840. The information about the first asset community 802 may include information from the machine module 810, or the information may include information from the asset cloud computing system 820. In an example, the information from the asset cloud computing system 820 may include information about the first asset community 802 in the context of multiple other similar or dissimilar assets, and the interface device 840 may include options for optimizing one or more members of the first asset community 802 based on analytics performed at the asset cloud computing system 820.

In an example, an operator selects a parameter update for the first wind turbine 801 using the interface device 840, and the parameter update is pushed to the first wind turbine via one or more of the asset cloud computing system 820, the gateway 805, and the machine module 810. In an example, the interface device 840 is in data communication with the enterprise computing system 830 and the interface device 840 provides an operation with enterprise-wide data about the first asset community 802 in the context of other business or process data. For example, choices with respect to asset optimization may be presented to an operator in the context of available or forecasted raw material supplies or fuel costs. In an example, choices with respect to asset optimization may be presented to an operator in the context of a process flow to identify how efficiency gains or losses at one asset may impact other assets. In an example, one or more choices described herein as being presented to a user or operator may alternatively be made automatically by a processor circuit according to earlier-specified or programmed operational parameters. In an example, the processor circuit may be located at one or more of the interface device 840, the asset cloud computing system 820, the enterprise computing system 830, or elsewhere.

Returning again to the example of FIG. 8 some capabilities of the first AMP 800 are illustrated. The example of FIG. 8 includes the first asset community 802 with multiple wind turbine assets, including the first wind turbine 801. Wind turbines are used in some examples herein as non-limiting examples of a type of industrial asset that can be a part of, or in data communication with, the first AMP 800.

In an example, the multiple turbine members of the asset community 802 include assets from different manufacturers or vintages. The multiple turbine members of the asset community 802 may belong to one or more different asset communities, and the asset communities may be located locally or remotely from one another. For example, the members of the asset community 802 may be co-located on a single wind farm, or the members may be geographically distributed across multiple different farms. In an example, the multiple turbine members of the asset community 802 may be in use (or non-use) under similar or dissimilar environmental conditions, or may have one or more other common or distinguishing characteristics.

FIG. 8 further includes the device gateway 805 configured to couple the first asset community 802 to the asset cloud computing system 820. The device gateway 805 may further couple the asset cloud computing system 820 to one or more other assets or asset communities, to the enterprise computing system 830, or to one or more other devices. The first AMP 800 thus represents a scalable industrial solution that extends from a physical or virtual asset (e.g., the first wind turbine 801) to a remote asset cloud computing system 820. The asset cloud computing system 820 optionally includes a local, system, enterprise, or global computing infrastructure that can be optimized for industrial data workloads, secure data communication, and compliance with regulatory requirements.

In an example, information from an asset, about the asset, or sensed by an asset itself is communicated from the asset to the data acquisition module 824 in the asset cloud computing system 820. In an example, an external sensor may be used to sense information about a function of an asset, or to sense information about an environment condition at or near an asset. The external sensor may be configured for data communication with the device gateway 805 and the data acquisition module 824, and the asset cloud computing system 820 may be configured to use the sensor information in its analysis of one or more assets, such as using the analytics module 822.

In an example, the first AMP 800 may use the asset cloud computing system 820 to retrieve an operational model for the first wind turbine 801, such as using the asset module 821. The model may be stored locally in the asset cloud computing system 820, or the model may be stored at the enterprise computing system 830, or the model may be stored elsewhere. The asset cloud computing system 820 may use the analytics module 822 to apply information received about the first wind turbine 801 or its operating conditions (e.g., received via the device gateway 805) to or with the retrieved operational model. Using a result from the analytics module 822, the operational model may optionally be updated, such as for subsequent use in optimizing the first wind turbine 801 or one or more other assets, such as one or more assets in the same or different asset community. For example, information about the first wind turbine 801 may be analyzed at the asset cloud computing system 820 to inform selection of an operating parameter for a remotely located second wind turbine that belongs to a different second asset community.

The first AMP 800 includes a machine module 810. The machine module 810 may include a software layer configured for communication with one or more industrial assets and the asset cloud computing system 820. In an example, the machine module 810 may be configured to run an application locally at an asset, such as at the first wind turbine 801. The machine module 810 may be configured for use with, or installed on, gateways, industrial controllers, sensors, and other components. In an example, the machine module 810 includes a hardware circuit with a processor that is configured to execute software instructions to receive information about an asset, optionally process or apply the received information, and then selectively transmit the same or different information to the asset cloud computing system 820.

In an example, the asset cloud computing system 820 may include the operations module 825. The operations module 825 may include services that developers may use to build or test Industrial Internet applications, or the operations module 825 may include services to implement Industrial Internet applications, such as in coordination with one or more other AMP modules. In an example, the operations module 825 includes a microservices marketplace where developers may publish their services and/or retrieve services from third parties. The operations module 825 can include a development framework for communicating with various available services or modules. The development framework may offer developers a consistent look and feel and a contextual user experience in web or mobile applications.

In an example, an AMP may further include a connectivity module. The connectivity module may optionally be used where a direct connection to the cloud is unavailable. For example, a connectivity module may be used to enable data communication between one or more assets and the cloud using a virtual network of wired (e.g., fixed-line electrical, optical, or other) or wireless (e.g., cellular, satellite, or other) communication channels. In an example, a connectivity module forms at least a portion of the gateway 805 between the machine module 810 and the asset cloud computing system 820.

In an example, an AMP may be configured to aid in optimizing operations or preparing or executing predictive maintenance for industrial assets. An AMP may leverage multiple platform components to predict problem conditions and conduct preventative maintenance, thereby reducing unplanned downtimes. In an example, the machine module 810 is configured to receive or monitor data collected from one or more asset sensors and, using physics-based analytics (e.g., finite element analysis or some other technique selected in accordance with the asset being analyzed), detect error conditions based on a model of the corresponding asset. In an example, a processor circuit applies analytics or algorithms at the machine module 810 or at the asset cloud computing system 820.

In response to the detected error conditions, the AMP may issue various mitigating commands to the asset, such as via the machine module 810, for manual or automatic implementation at the asset. In an example, the AMP may provide a shut-down command to the asset in response to a detected error condition. Shutting down an asset before an error condition becomes fatal may help to mitigate potential losses or to reduce damage to the asset or its surroundings. In addition to such an edge-level application, the machine module 810 may communicate asset information to the asset cloud computing system 820.

In an example, the asset cloud computing system 820 may store or retrieve operational data for multiple similar assets. Over time, data scientists or machine learning may identify patterns and, based on the patterns, may create improved physics-based analytical models for identifying or mitigating issues at a particular asset or asset type. The improved analytics may be pushed back to all or a subset of the assets, such as via multiple respective machine modules 810, to effectively and efficiently improve performance of designated (e.g., similarly-situated) assets.

In an example, the asset cloud computing system 820 includes a Software-Defined Infrastructure (SDI) that serves as an abstraction layer above any specified hardware, such as to enable a data center to evolve over time with minimal disruption to overlying applications. The SDI enables a shared infrastructure with policy-based provisioning to facilitate dynamic automation, and enables SLA mappings to underlying infrastructure. This configuration may be useful when an application requires an underlying hardware configuration. The provisioning management and pooling of resources may be done at a granular level, thus allowing optimal resource allocation.

In a further example, the asset cloud computing system 820 is based on Cloud Foundry (CF), an open source PaaS that supports multiple developer frameworks and an ecosystem of application services. Cloud Foundry can make it faster and easier for application developers to build, test, deploy, and scale applications. Developers thus gain access to the vibrant CF ecosystem and an ever-growing library of CF services. Additionally, because it is open source, CF can be customized for IIoT workloads.

The asset cloud computing system 820 may include a data services module that may facilitate application development. For example, the data services module may enable developers to bring data into the asset cloud computing system 820 and to make such data available for various applications, such as applications that execute at the cloud, at a machine module, or at an asset or other location. In an example, the data services module may be configured to cleanse, merge, or map data before ultimately storing it in an appropriate data store, for example, at the asset cloud computing system 820. A special emphasis has been placed on time series data, as it is the data format that most sensors use.

Security may be a concern for data services that deal in data exchange between the asset cloud computing system 820 and one or more assets or other components. Some options for securing data transmissions include using Virtual Private Networks (VPN) or an SSL/TLS model. In an example, the first AMP 800 may support two-way TLS, such as between a machine module and the security module 824. In an example, two-way TLS may not be supported, and the security module 824 may treat client devices as OAuth users. For example, the security module 824 may allow enrollment of an asset (or other device) as an OAuth client and transparently use OAuth access tokens to send data to protected endpoints.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein. The method steps can then be carried out using the distinct software modules and/or sub-modules of the system, as described above, executing on one or more hardware processors 710 (FIG. 7). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

The invention claimed is:

1. A system for building a model comprising:
a display;
a memory storing processor-executable process steps; and
a processor to execute the processor-executable process steps to cause the system to:
present a user interface on a display, the user interface including one or more user-entry fields to build a model, wherein at least one of the one or more user-entry fields is associated with a selection of big data or small data for use with the model;
receive selection of a model technique operative to be executed by the built model;
determine whether the model technique is multimodal, and in a case the model technique is determined to be multimodal, the model technique supports both big data and small data;
receive at least one data source in a user-entry field associated with the model;
determine if data in the data source includes big data or small data, wherein the determination is based on at least one of a size of the data and the number of entries in the data; and
in response to the determination of big data or small data in the data source, execute the model with data from the data source in a big data environment in a case the data is determined to be big data or a small data environment in a case the data is determined to be small data.

2. The system of claim 1, wherein selection of small data further causes the system to:
execute the model in a container.

3. The system of claim 2, wherein the container includes an entire run-time environment.

4. The system of claim 2, wherein execution of the model further causes the system to:
receive data for use with the model from a local server.

5. The system of claim 1, wherein selection of big data further causes the system to:
transmit one or more service calls to the big data environment.

6. The system of claim 5, wherein the big data environment includes a cluster of processors.

7. The system of claim 5, wherein selection of big data further causes the system to:
execute the model in the big data environment.

8. The system of claim 7, wherein execution of the model further causes the system to:
retrieve data already-stored in the big data environment.

9. The system of claim 5, wherein the one or more service calls are stored in an interface container, and the one or more service calls are transmitted to the big data environment from the interface container based on a determination of big data.

10. The system of claim 5, wherein the one or more service calls are invoked as Representational State Transfer (REST) calls at the big data environment.

11. The system of claim 5, wherein the service call specifies a location of the data for use with the model, and a location of the model technique in the big environment.

12. The system of claim 11, wherein transmission of the service call further causes the system to:
read the data for use with the model;
split the data for use with the model into two or more buckets, forming a sub-set of data in each bucket;
execute the model on each sub-set of data;
receive an output from each bucket;
aggregate the output from the two or more buckets; and
store the output.

13. The system of claim 12, wherein the model is executed in parallel on each sub-set of data.

14. A method for building a model comprising:
presenting a user interface on a display, the user interface including one or more user-entry fields to build a model;
receiving selection of a model technique operative to be executed by the built model;
determining whether the model technique is multimodal, and in a case the model technique is determined to be multimodal, the model technique supports both big data and small data;
receiving at least one data source in a user-entry field associated with the model;
determining if data in the data source includes big data or small data, wherein the determination is based on at least one of a size of the data and the number of entries in the data; and
executing the model with data from the data source in one of a small data environment in a case the data is determined to be small data or a big data environment in a case the data is determined to be big data, the execution in response to the determination of big data or small data.

15. The method of claim 14, further comprising:
executing the model in a container based on a selection of small data.

16. The method claim 15, wherein the container includes an entire run-time environment.

17. The method of claim 15, wherein execution of the model further comprises:
receiving data for use with the model from a local server.

18. The method of claim 14, further comprising:
transmitting one or more service calls to the big data environment based on selection of big data.

19. The method of claim 18, wherein the big data environment includes a cluster of processors.

20. The method of claim 18, further comprising:
executing the model in the big data environment based on selection of big data.

21. The method of claim 20, wherein execution of the model further comprises:
retrieving data already-stored in the big data environment.

22. The method of claim 18, wherein the one or more service calls are stored in an interface container, and the one or more service calls are transmitted to the big data environment from the interface container based on the selection of big data.

23. The method of claim 18, further comprising:
invoking the one or more service calls as Representational State Transfer (REST) calls at the big data environment.

24. The method of claim 18, wherein the service call specifies a location of the data for use with the model, and a location of the model technique in the big environment.

25. The method of claim 24, wherein transmitting the service call further comprises:
reading the data for use with the model;
splitting the data for use with the model into two or more buckets, forming a sub-set of data in each bucket;
executing the model on each sub-set of data;
receiving an output from each bucket;
aggregating the output from the two or more buckets; and
storing the output.

26. A non-transitory, computer-readable medium storing instructions that, when executed by a computer processor, cause the computer processor to perform a method for building a model, the method comprising:
presenting a user interface on a display, the user interface including one or more user-entry fields to build a model, wherein at least one of the user-entry fields is associated with a selection of big data or small data for use with the model;
receiving selection of a model technique operative to be executed by the built model;
determining whether the model technique is multimodal and in a case the model technique is determined to be multimodal, the model technique supports both big data and small data;
receiving at least one data source in a user-entry field associated with the model;
determining if data in the data source includes big data or small data, wherein the determination is based on at least one of a size of the data and the number of entries in the data; and
executing the model with data from the data source in one of a small data environment in a case the data is determined to be small data or a big data environment in a case the data is determined to be big data, the execution in response to the determination of big data or small data.

* * * * *